United States Patent
Dabiri et al.

(10) Patent No.: US 8,279,912 B2
(45) Date of Patent: Oct. 2, 2012

(54) TRANCEIVER NON-LINEARITY CANCELLATION

(75) Inventors: Dariush Dabiri, San Jose, CA (US); Jose Tellado, Palo Alto, CA (US); Sandeep Kumar Gupta, Santa Clara, CA (US)

(73) Assignee: PLX Technology, Inc., Sunnyvale, CA (US)

( * ) Notice: Subject to any disclaimer, the term of this patent is extended or adjusted under 35 U.S.C. 154(b) by 1063 days.

(21) Appl. No.: 11/373,928

(22) Filed: Mar. 13, 2006

(65) Prior Publication Data
US 2007/0211794 A1 Sep. 13, 2007

(51) Int. Cl.
H04B 1/38 (2006.01)
H04B 1/40 (2006.01)
H03K 9/00 (2006.01)

(52) U.S. Cl. ........ 375/219; 375/221; 375/316; 375/295; 455/73; 455/88

(58) Field of Classification Search .................. 375/219, 375/220, 221, 229–236, 295, 316, 324, 346, 375/347, 350, 358, 362; 455/73, 78, 82, 455/83, 87, 88, 91, 115.1, 126, 130, 213
See application file for complete search history.

(56) References Cited

U.S. PATENT DOCUMENTS

| | | | | |
|---|---|---|---|---|
| 5,166,924 A | * | 11/1992 | Moose | 370/289 |
| 5,280,473 A | * | 1/1994 | Rushing et al. | 370/289 |
| 5,590,205 A | * | 12/1996 | Popovich | 381/71.11 |
| 5,633,863 A | * | 5/1997 | Gysel et al. | 370/290 |
| 5,787,113 A | * | 7/1998 | Chow et al. | 375/219 |
| 6,813,311 B1 | * | 11/2004 | Pal et al. | 375/219 |
| 6,856,191 B2 | | 2/2005 | Bartuni | |
| 6,934,387 B1 | | 8/2005 | Kim | |
| 6,946,983 B2 | | 9/2005 | Andersson et al. | |
| 7,027,592 B1 | * | 4/2006 | Straussnigg et al. | 379/406.08 |
| 2001/0038674 A1 | | 11/2001 | Trans | |
| 2002/0008578 A1 | | 1/2002 | Wright | |
| 2002/0065633 A1 | | 5/2002 | Levin | |
| 2003/0054788 A1 | | 3/2003 | Sugar et al. | |
| 2003/0206579 A1 | * | 11/2003 | Bryant | 375/219 |
| 2004/0044489 A1 | | 3/2004 | Jones et al. | |
| 2004/0095994 A1 | | 5/2004 | Dowling | |
| 2004/0213170 A1 | * | 10/2004 | Bremer | 370/282 |

(Continued)

FOREIGN PATENT DOCUMENTS

WO WO0052844 * 9/2000

OTHER PUBLICATIONS

StatSoft, Inc., "Nonlinear Estimation", StatSoft, Inc, 1984-2008, pp. 1-12.*

(Continued)

*Primary Examiner* — Sam K Ahn
*Assistant Examiner* — Linda Wong
(74) *Attorney, Agent, or Firm* — Brian R. Short

(57) ABSTRACT

Embodiments of a method and apparatus for reducing non-linear transmit signal components of a receive signal of a transceiver signal are disclosed. The method includes the transceiver simultaneously transmitting a transmit signal, and receiving the receive signal. A non-linear replica signal of non-linear transmission signal components that are created in the transceiver by a transmit signal DAC, and imposed onto the receive signal, is generated. The non-linear replica signal is subtracted from the received signal reducing the non-linear transmission signal components imposed onto the receive signal.

17 Claims, 11 Drawing Sheets

U.S. PATENT DOCUMENTS

| | | |
|---|---|---|
| 2005/0008084 A1 | 1/2005 | Zhidkov |
| 2005/0123004 A1 | 6/2005 | Lechleider |
| 2005/0187759 A1 | 8/2005 | Malah et al. |
| 2005/0207346 A1 | 9/2005 | Chu et al. |
| 2005/0220185 A1* | 10/2005 | Dowling .................. 375/232 |
| 2005/0243946 A1 | 11/2005 | Chung et al. |
| 2006/0039550 A1* | 2/2006 | Chadha et al. .......... 379/406.09 |
| 2007/0190952 A1 | 8/2007 | Waheed et al. |
| 2007/0260455 A1 | 11/2007 | Akamine et al. |
| 2009/0222226 A1 | 9/2009 | Baraniuk et al. |

OTHER PUBLICATIONS

Lavry Engineering, "Sampling, oversampling, Imaging and Aliasing—A Basic Tutorial", Lavry Engineering, 1997, pp. 1-6.*

* cited by examiner

TRANCEIVER NON-LINEARITY CANCELLATION

FIELD OF THE INVENTION

The invention relates generally to network communications. More particularly, the invention relates to a method and apparatus for cancellation of transceiver non-linearity due to transmit signals.

BACKGROUND OF THE INVENTION

High-speed networks are continually evolving. The evolution includes a continuing advancement in the operational speed of the networks. The network implementation of choice that has emerged is Ethernet networks physically connected over unshielded twisted pair wiring. Ethernet in its 10/100BASE-T form is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates.

FIG. 1 shows a block diagram of a pair of Ethernet transceivers communicating over a bi-directional transmission channel, according to the prior art. An exemplary transmission channel includes four pairs of copper wire 112, 114, 116, 118. The transceiver pair can be referred to as link partners, and includes a first Ethernet port 100 and a second Ethernet port 105. Both of the Ethernet ports 100, 105 include four transmitter $T_X$, receiver $R_X$, and I/O buffering sections corresponding to each of the pairs of copper wires 112, 114, 116, 118.

An implementation of high speed Ethernet networks includes simultaneous, full bandwidth transmission, in both directions (termed full duplex), within a selected frequency band. When configured to transmit in full duplex mode, Ethernet line cards are generally required to have transmitter and receiver sections of an Ethernet transceiver connected to each other in a parallel configuration to allow both the transmitter and receiver sections to be connected to the same twisted wiring pair for each of four pairs.

One result of full duplex transmission is that the transmit signals shares the same transmission channel as the receive signals, and some of the transmit signal processing shares at least some electronic circuitry with receive processing. Non-linearities of transmit signals can be generated within the transmitter section of the transceiver, and at least some of the non-linearities can be imposed onto the receive signal. The result is distortion of the receive signal.

Full duplex transmission can result in at least a portion of the transmit signal being coupled back into the receive signal. The portion of the transmit signal that couples back is referred to as an echo signal. Linear portions of the echo signal can be canceled by subtracting an approximate echo signal from the received signal. Generation of the echo cancellation signal, and cancellation process can also introduce non-linearities which can be imposed on the receive signal. The result is additional distortion of the receive signal.

Additionally, the receive signal itself can introduce non-linearities. For example, the receiver section typically includes an ADC which converts the analog receive signal into a digital stream. This ADC can introduce receive signal non-linearity.

It is desirable to have an apparatus and method for reducing non-linearity of a receive signal due to a transmission signal of a full-duplex transceiver. It is additionally desirable to reduce non-linearity of the receive signal due to echo signal cancellation.

SUMMARY OF THE INVENTION

An embodiment of the invention includes a method of reducing non-linear transmit signal components of a receive signal of a transceiver. The method includes the transceiver simultaneously transmitting a transmit signal, and receiving the receive signal. A non-linear replica signal of non-linear transmission signal components that are created in the transceiver by a transmit signal DAC, and imposed onto the receive signal, is generated. The non-linear replica signal is combined with the received signal reducing the non-linear transmission signal components imposed onto the receive signal.

Another embodiment includes an Ethernet transceiver. The transceiver includes a transmitter for transmitting a transmit signal, and a receiver for receiving a receive signal. A non-linear filter receives the transmit signal and generates a non-linear replica signal of non-linear transmit signal DAC components imposed onto receive signal in the transceiver. A summer combines the replica with the receive signal to cancel non-linear transmit signal DAC component of the receive signal.

Another embodiment includes a method of linearizing an Ethernet received signal of an Ethernet transceiver. The method includes the transceiver simultaneously transmitting a transmit signal and receiving the receive signal, generating a non-linear replica signal, the non-linear replica signal approximating non-linear signal components of the transmission signal imposed onto the receive signal within the transceiver, and combining the non-linear replica signal from the receive signal.

Other aspects and advantages of the present invention will become apparent from the following detailed description, taken in conjunction with the accompanying drawings, illustrating by way of example the principles of the invention.

BRIEF DESCRIPTION OF THE DRAWINGS

The present invention is readily understood by the following detailed description in conjunction with the accompanying drawings, wherein like reference numerals designate like structural elements, and in which.

DETAILED DESCRIPTION

Figure 1:
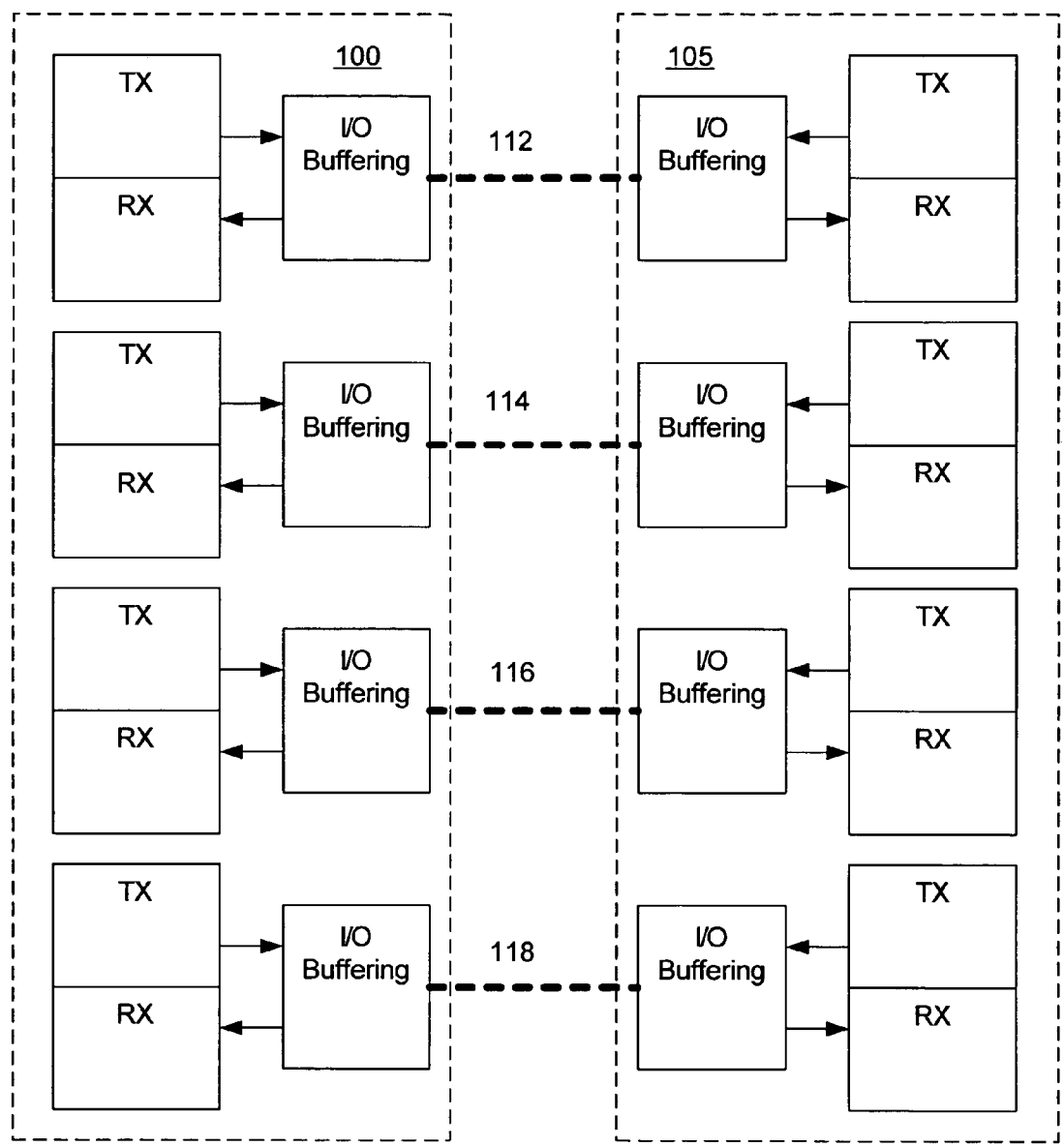
FIG. 1 shows a plurality of prior art Ethernet transceiver pairs.

As shown in the drawings for purposes of illustration, the invention is embodied in an apparatus and methods for linearizing receive signals of a transceiver. Non-linearities due to transmission signals, transmission echo cancellation signals, and the receive signal can be reduced by generating non-linear signal cancellation signals. The non-linear signal cancellation signals can be generated by non-linear filtering of transmit signals, echo cancellation signals and the receive signals.

The descriptions provided are generally focused on Ethernet transceivers, but the embodiment can be used in other configurations of transceivers as well.

Figure 2:
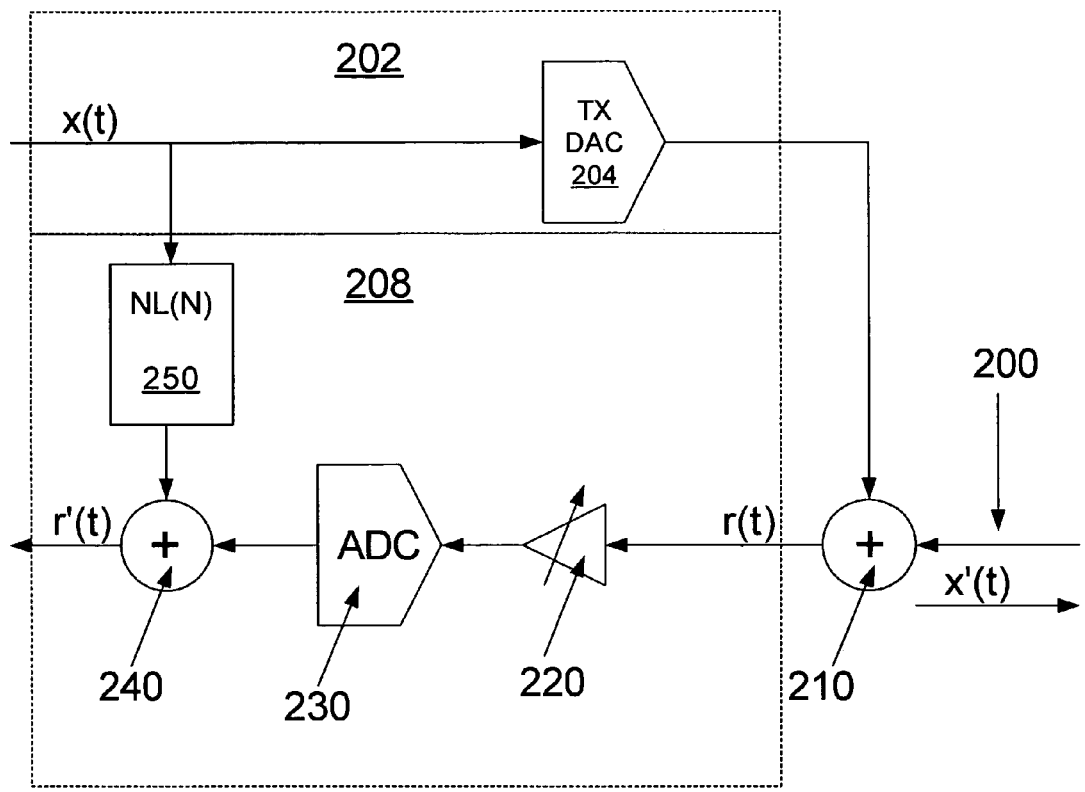
FIG. 2 shows a block diagram of one example of a transceiver that can utilizes methods of receive signal linearization.

FIG. 2 shows a block diagram of one example of a transceiver that can utilizes methods of receive signal linearization. The transceiver includes a transmitter section 202 for transmitting a transmit signal x(t) and a receiver section 208 for receiving a receive signal r(t). A non-linear filter 250 receives the transmit signal x(t) and generates a non-linear replica signal of non-linear transmit signal components imposed onto receive signal in the transceiver. A summer 240 negatively sums (combines) the replica with the receive signal to cancel non-linear transmit signal component of the receive signal. The non-linear replica signal is an estimate of the non-linear transmit signal components imposed on the receive signal.

The receiver section 208 can additionally include an adjustable gain amplifier 220, and analog to digital converter (ADC) 230.

Another summer 210 shown in FIG. 2 shows the transmit signal and the receive signal being connected to a common transmission channel 200. At least a portion of the transceiver, and the transmission channel 200 are shared by both the transmitter section and receiver section of the transceiver. An embodiment can include a hybrid circuit within the transceiver in which the transmit and receive signals are summed.

The digital transmission signal x(t) is passed through a transmission DAC 204 before transmission through the transmission channel 200, generating an analog transmission signal x'(t). The digital to analog conversion can create non-linear signal components that can be imposed on the receive signal. These non-linearities reduce the performance of the transceiver.

The non-linear replica signal generated by the non-linear filtering of the transmission signal reduces the non-linear components imposed on the receive signal by negatively summing the non-linear replica signal with the receive signal. The non-linear replica signal cancels the non-linear components imposed on the receive signal by, for example, the transmission DAC 204.

For this embodiment, the non-linear filter receives a single input which can be the transmission signal x(t), and generates the non-linear replica signal. As will be described, the non-linear filtering can include linear combinations of known regressors. Coefficients of the non-linear filter can be determined by correlating an output of a receiver ADC 230 with an output of a corresponding regressor within the filter. That is, as will be shown, each coefficient of the filter corresponds with a particular regressor. The adaptively determined value of the coefficient can be calculated by correlating the output of the corresponding regressor and the digitally sampled receive signal. Embodiments of the non-linear filter will be described.

Figure 3:
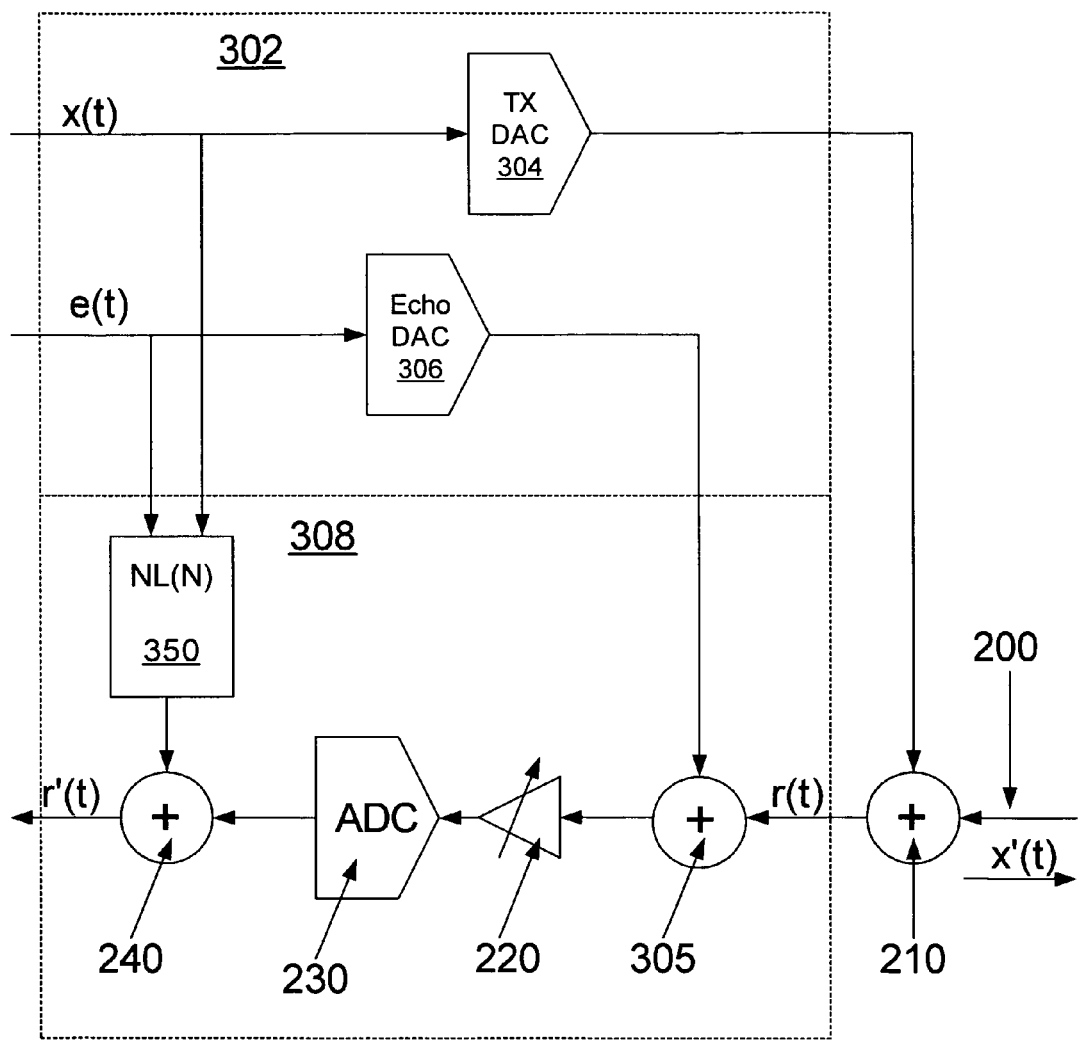
FIG. 3 shows a block diagram of another example of a transceiver that can utilized methods of receive signal linearization.

FIG. 3 shows a block diagram of another example of a transceiver that can utilized methods of receive signal linearization. This transceiver additionally includes an echo signal canceller 305. The direct connection between the transmitter section and the receiver section typically causes at least a portion of transmitter signals to be additionally received by the receiver, resulting in an echo signal. An echo cancellation signal e(t) can be generated, for example, by filtering the transmission signal. The echo cancellation signal e(t) is summed with the receive signal to mitigate the effects of the echo signal.

The echo cancellation signal can generate non-linearities as well. For example, an echo signal DAC 306 can generate non-linear signal components that can be imposed on the receive signal. A multiple input non-linear filter 350 can filter the transmission signal x(t) and the echo signal e(t) generating the non-linear replica signal. The non-linear replica signal is combined with the receive signal, reducing the non-linearites of the receive signal as imposed by the transmit signal DAC non-linearities and the echo signal DAC non-linearities. FIG. 3 shows cancellation of non-linearities of both DACs. However, the transceiver can include only cancellation of transmit signal DAC non-linearites as shown in FIG. 2, or alternatively, the transceiver can include only cancellation of echo signal DAC non-linearities.

As described, the non-linear filter 350 includes multiple inputs (x(t), e(t)) and generates a single output (the non-linear replica signal). Coefficients of the non-linear filter can be determined by correlating an output of a receiver ADC 230 with an output of a corresponding regressor within the filter.

The either or both of the DACs 304, 306 can be over-sampled. That is, the sampling rate of the DACs 304, 306 can be set to a rate that is greater than the symbol rate of the symbol stream being received by the DACs 304, 306. Therefore, the linearizing is performed on over-sampled signals. The symbol rate can be, for example, 800 MHz. Over-sampling can be used for all of the different methods of signal linearization discussed.

Figure 4:
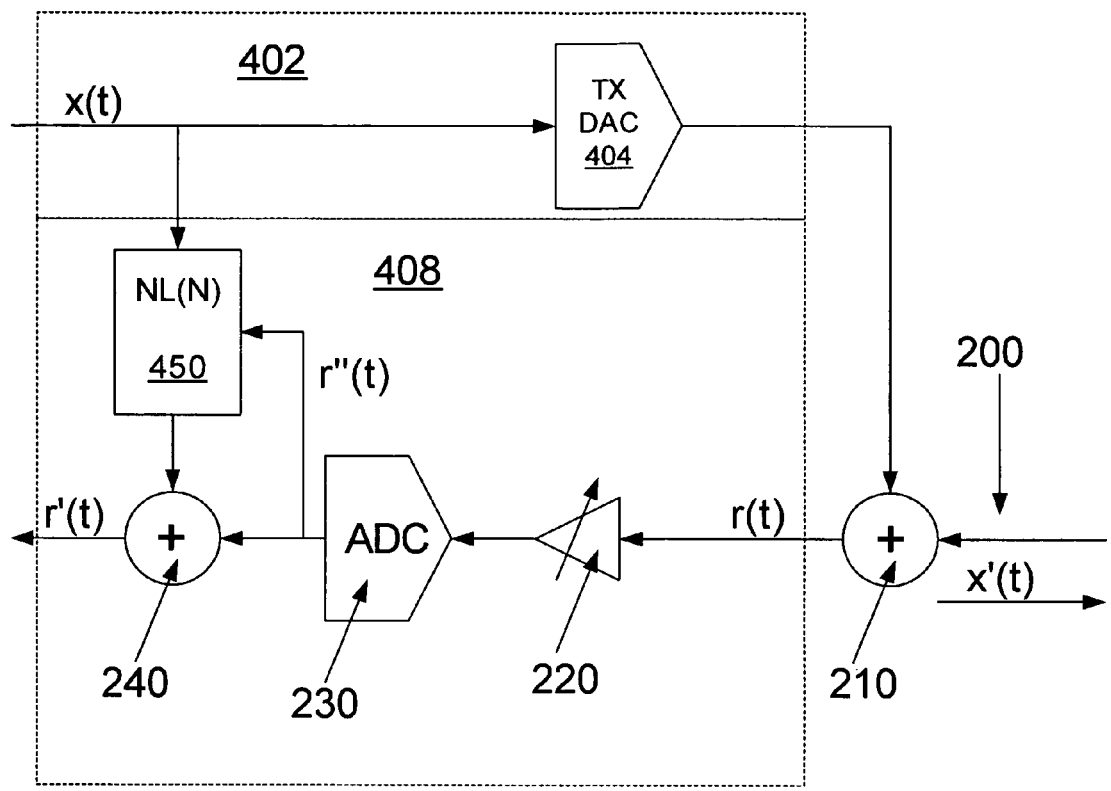
FIG. 4 shows a block diagram of another example of a transceiver that can utilized methods of receive signal linearization.

FIG. 4 shows a block diagram of another example of a transceiver that can utilize methods of receive signal linearization. This embodiment additionally includes compensation for non-linearities caused by the receive signal.

The non-linear replica signal is generated by a multiple input non-linear filter 450 that filters the transmit signal and the receive signal, generating the non-linear replica signal. As previously described, the transmission DAC 404 of the transmit signal x(t) can cause non-linear distortion of the transmission signal x(t) that can be imposed on the receive signal r(t). The non-linear replica signal generated by the non-linear filter 450 is negatively summed (combined) with the receive signal at a summer 240 reducing the non-linear components (distortion) imposed on the receive signal.

The receive signal r(t) is converted to an digital signal r"(t) be the ADC 230. This conversion can additionally contribute to the non-linear components (distortion) of the receive signal. The non-linear replica signal of the non-linear filter 450 can also reduce these non-linear components by filtering the receive signal r"(t). The non-linear replica signal is influenced by the filtering and is summed (combined) at the summer 240 to reduce the non-linear components generated by the ADC 230.

The signal amplitude of the receive signal is amplified by the adjustable gain amplifier 220 before the receive signal is passed through the ADC 230. The amplifier 220 can cause non-linear distortion of the receive signal. The non-linear distortion can be signal amplitude and/or signal frequency dependent. The non-linear distortion can additionally be dependent on other sources of receive signal distortion, such as, NEXT, FEXT and echo signal distortion.

Figure 5:
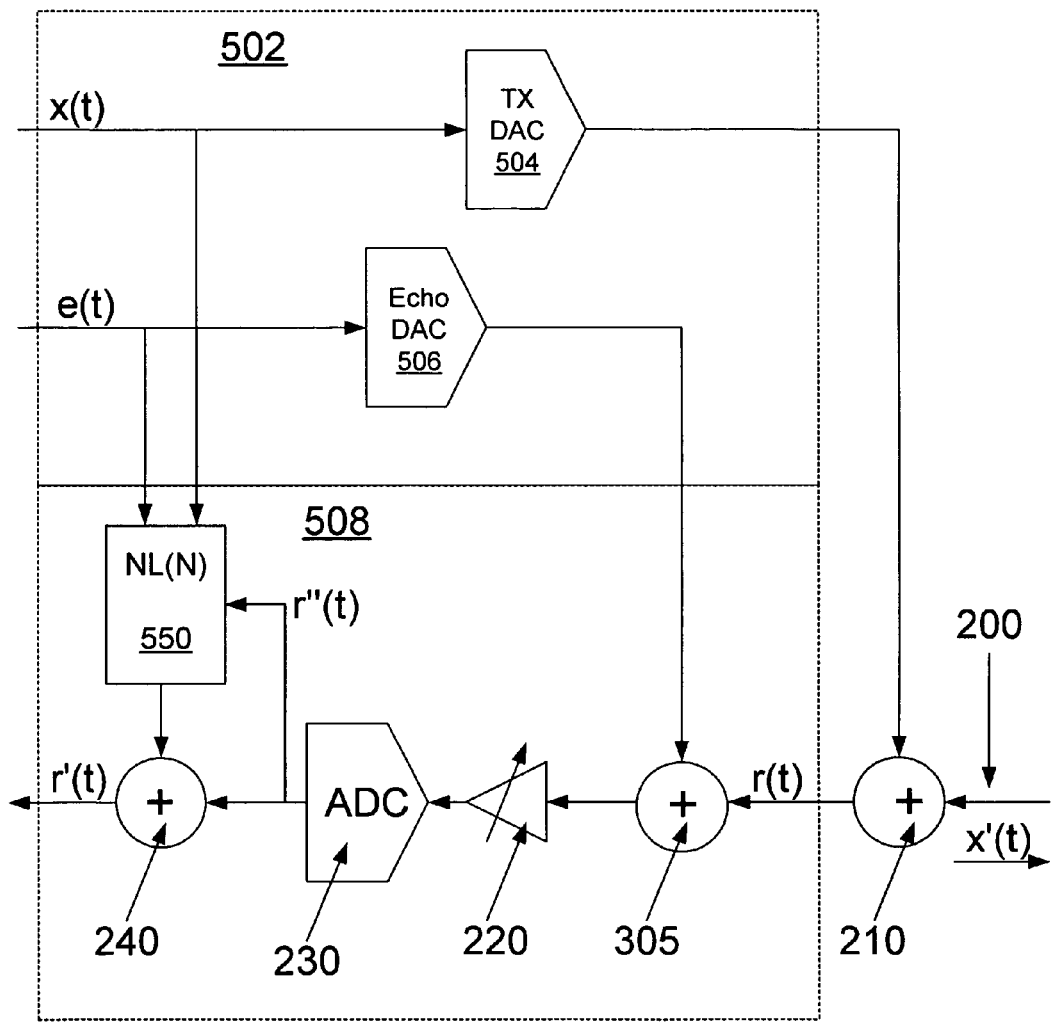
FIG. 5 shows a block diagram of another example of a transceiver that can utilized methods of receive signal linearization.

FIG. 5 shows a block diagram of another exemplary transceiver that can utilized methods of receive signal linearization. This embodiment includes compensation for non-linearities introduced by the transmit signal, the echo cancellation signal and the receive signal.

The multiple input non-linear filter 550 receives the transmission signal x(t), the echo signal e(t) and the digital receive signal r"(t). The non-linear filtering can include linear combinations of known regressors. Coefficients of the non-linear filter can be determined by correlating an output of a receiver ADC 230 with an output of a corresponding regressor within the filter. That is, as will be shown, each coefficient of the filter corresponds with a particular regressor. The adaptively determined value of the coefficient can be calculated by correlating the output of the corresponding regressor and the digitally sampled receive signal.

Pre-Compensator

Figure 6:
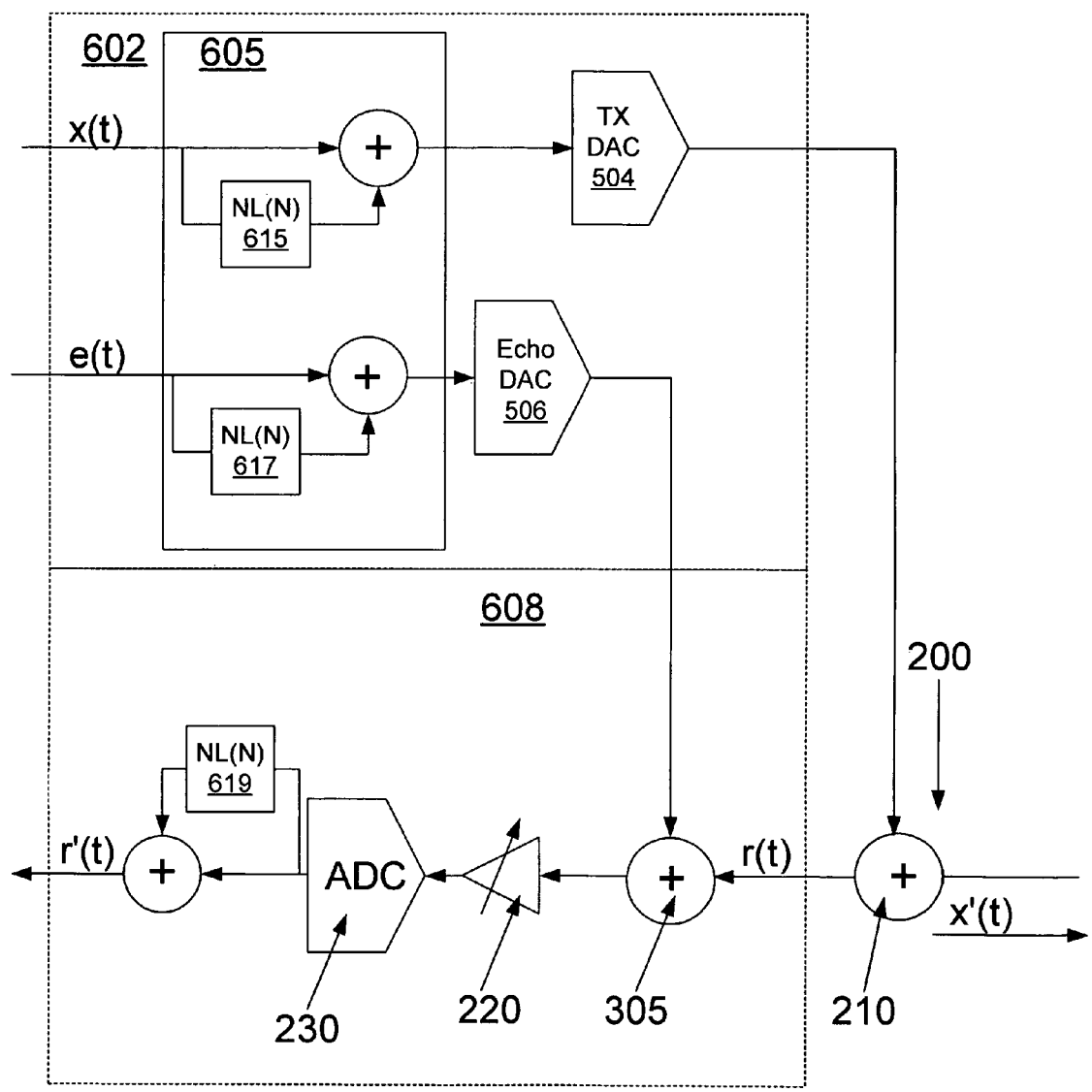
FIG. 6 shows a block diagram of another example of a transceiver that can utilized methods of receive signal linearization.

FIG. 6 shows a block diagram of another exemplary transceiver that can utilized methods of receive signal linearization. This embodiment shows that a pre-compensator can be used to effectively cancel the non-linear signal components imposed on the receive signal before the non-linear signal components are imposed on the receive signal. That is, the non-linearities are pre-compensated. The pre-compensation occurs within the transmitter section 605 rather than in the receiver section 608 of the transceiver 602.

One example of a pre-compensator 605 as shown includes non-linear filters 615, 617 providing pre-compensation signals for both the transmit signal and the echo signal. The pre-compensation signal are summed with the transmission signal and the echo signal, before the transmission signal and the echo signal are summed with the receive signal. The non-linear signal components of the transmission signal and the echo signal are subtracted from the transmission signal and the echo signal, before the transmission signal and the echo signal are summed with the receive signal. That is, the non-linear signal components of the transmission signal and the echo signal are pre-compensated.

The non-linear filters 615, 617 can include the same structure as the previously shown non-linear filters. A single input non-linear filter will be described in greater detail. The methods of selecting regressors, and adaptively determining filter coefficients is also the same as the previously described non-linear filters.

FIG. 6 also includes a receive signal non-linear filter 619 that can additionally or alternatively be included. The non-linear filter 619 can be implemented using similar non-linear filter structures as described. The non-linear filter filters the receive signal to generate a non-linear signal for canceling non-linear signal components of the receive signal.

Figure 7:
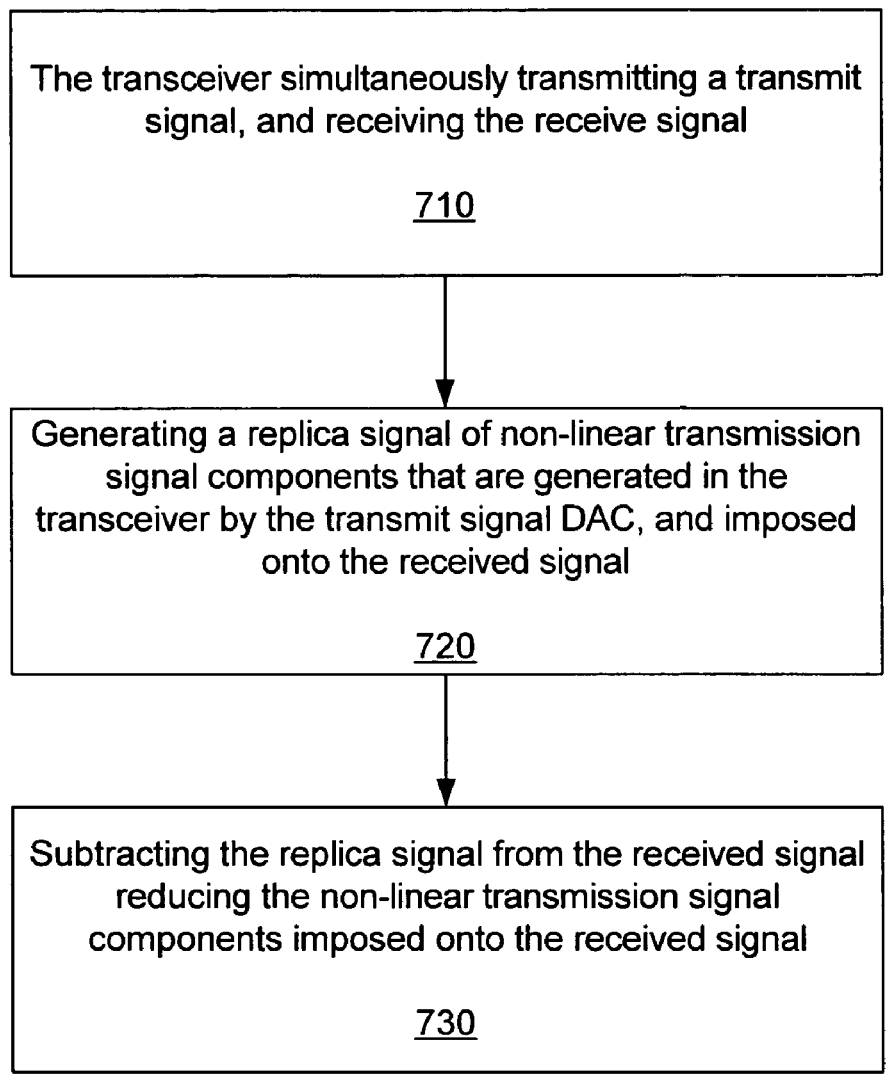
FIG. 7 is a flow chart of one example of a method of linearizing a receive signal of a transceiver.

FIG. 7 is a flow chart of an exemplary method of linearizing a receive signal of a transceiver. A first step 710 includes the transceiver simultaneously transmitting a transmit signal, and receiving the receive signal. A second step 720 includes generating a non-linear replica signal of non-linear transmission signal components that are generated in the transceiver by the transmit signal, and coupled onto the received signal. A third step 730 includes subtracting the non-linear replica signal from the received signal reducing the non-linear transmission signal components coupled onto the received signal.

One example of the method of linearizing the received signal includes setting the non-linear replica signal equal to a sum of approximations of the non-linear transmission signal components that are created in the transceiver by the transmit signal DAC, and/or non-linear signal components that are generated in the transceiver by an estimated echo signal DAC, and imposed on the receive signal. Another example of the method of linearizing the received signal includes setting the non-linear replica signal equal to a sum of approximations of the non-linear transmission signal components that are generated in the transceiver by the transmit signal DAC, and non-linear signal components that are generated in the transceiver by the receive signal. Another example of the method of linearizing the received signal includes setting the non-linear replica signal equal to a sum of approximations of the non-linear transmission signal components that are generated in the transceiver by the transmit signal DAC, non-linear signal components that are generated in the transceiver by the estimated echo signal DAC, and non-linear signal components that are generated by the receive signal.

Figure 8:
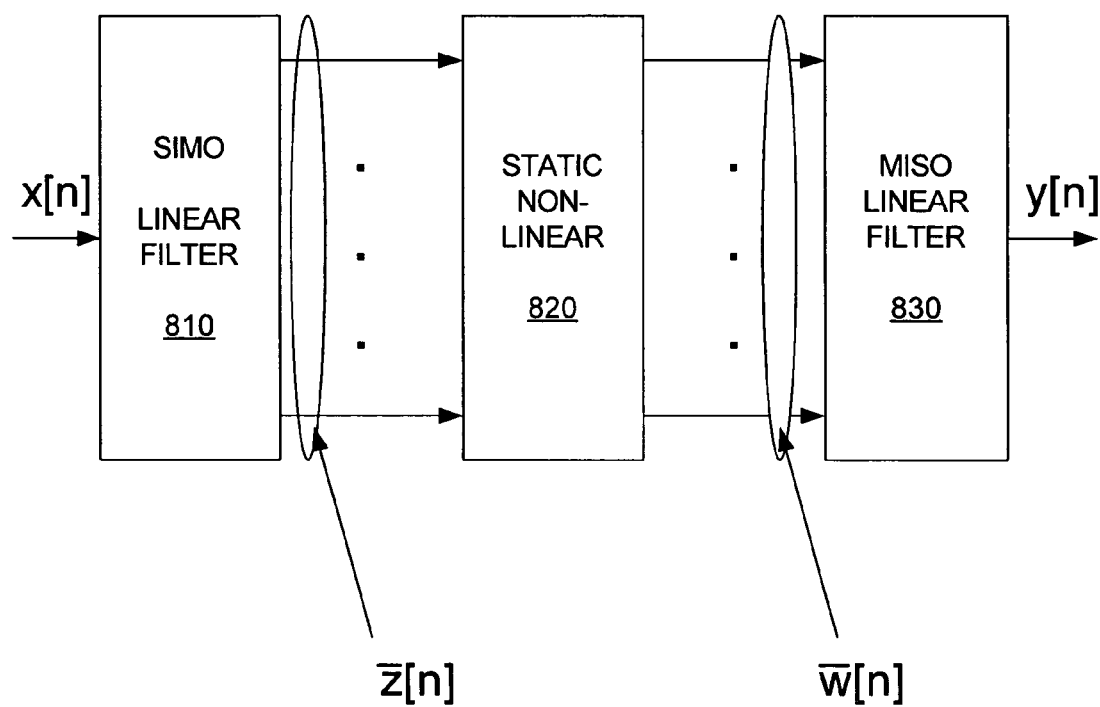
FIG. 8 shows a generalized non-linear filter which can be used for receive signal linearization.

FIG. 8 shows a generalized non-linear filter which can be used for receive signal linearization. This non-linear filter includes a single-input, multiple output (SIMO) linear filter section 810, a static non-linear section 820 and a multiple-input, signal-output (MISO) linear filter 830. As shown, an output z[n] of the SIMO linear filter section 810 is a vector. The static non-linear section 820 as shown does not have any memory, and a vector output w[n] of the static non-linear section 820 is a function of the input z[n]. That is, w[n]=f(z[n]). The non-linear filter configuration of FIG. 8 can be altered to provide a SIMO or multiple-input, multiple-output MIMO input to output non-linear filter relationships. Several specific examples of embodiments of non-linear filters will be described.

Figure 9:
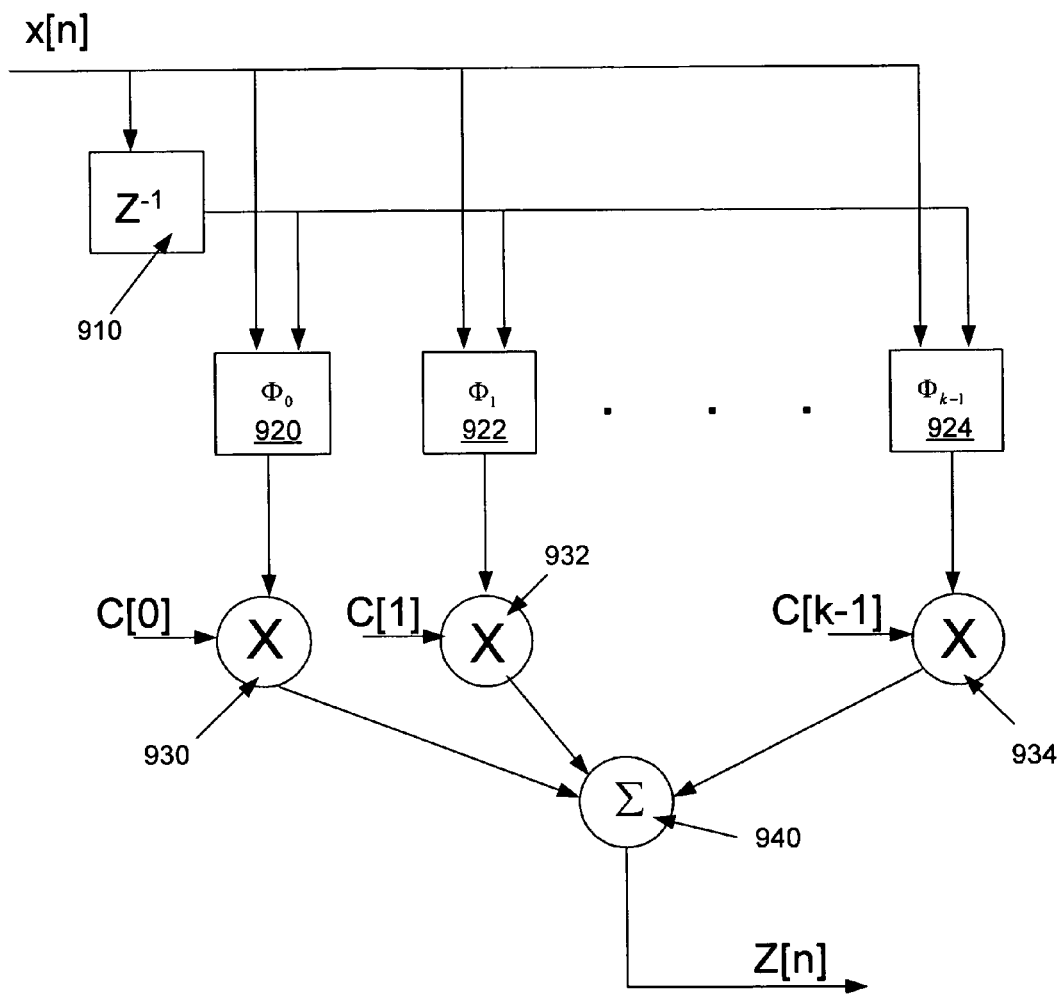
FIG. 9 shows a block diagram of one example of a single input non-linear filter.

FIG. 9 shows a block diagram of an exemplary single input non-linear filter. This non-linear filter configuration can be particularly adaptable for use within an Ethernet transceiver that has non-linearity components due to a transmitter DAC imposed on a receive signal.

This implementation includes a delay 910. The input x[n] and a delayed version of x[n] (x[n-1]) are connected to multiple regressors 920, 922, 924. Outputs of the regressors are multiplied by coefficients C[0], C[1] ... C[k-1] and summed, generating a filter output Z[n]. Only one delay is shown in FIG. 9, but additional delays can be used generating x[n], x[n-1], x[n-2] . . . .

Regressors

The term regressor is commonly used in the field of statistics. An implementation of a regressor can include implementing or selecting a function. Exemplary functions that can be selected include polynomials, sinusoidal functions, splines, and wavelets. The function selection for the non-linear filters used for reducing non-linearities of receive signals is based upon prior knowledge of the non-linearities. More specifically, the function selection is based upon prior knowledge regarding the transmission DAC and/or the echo DAC non-linearities, and/or receive signal non-linearities. Once a function has been selected, the selected function can be fine-tuned based upon the prior knowledge of the DAC non-linearities.

When in operation, the regressors are pre-selected and do not change. The coefficients adaptively change as will be described.

Adaptive Determination of Coefficient Values

One example of a method of adaptively determining values of the coefficients C[0], C[1] ... C[k-1] includes correlating the digital receive signal from the receiver ADC with outputs of the regressors 920, 922, 924. For example, the value of the coefficient C[0] is determined by correlating the digital receive signal with the output of the regressor 920, the value of the coefficient C[1] is determined by correlating the digital receive signal with output of the regressor 922 and the value of the coefficient C[k-1] is determined by correlating the analog digital signal with the output of the regressor 924.

The output of the receiver ADC (such as receiver ADC 230 includes a stream of data that can be correlated with each of the outputs of the regressors. The coefficients can be determined from the correlations.

As previously described, the regressors are previously selected. The coefficients are adjusted so that the linear combinations of the outputs of the regressors is a close approximation of the observed non-linearities as observed at the outputs of the receiver ADC 230.

Figure 10:
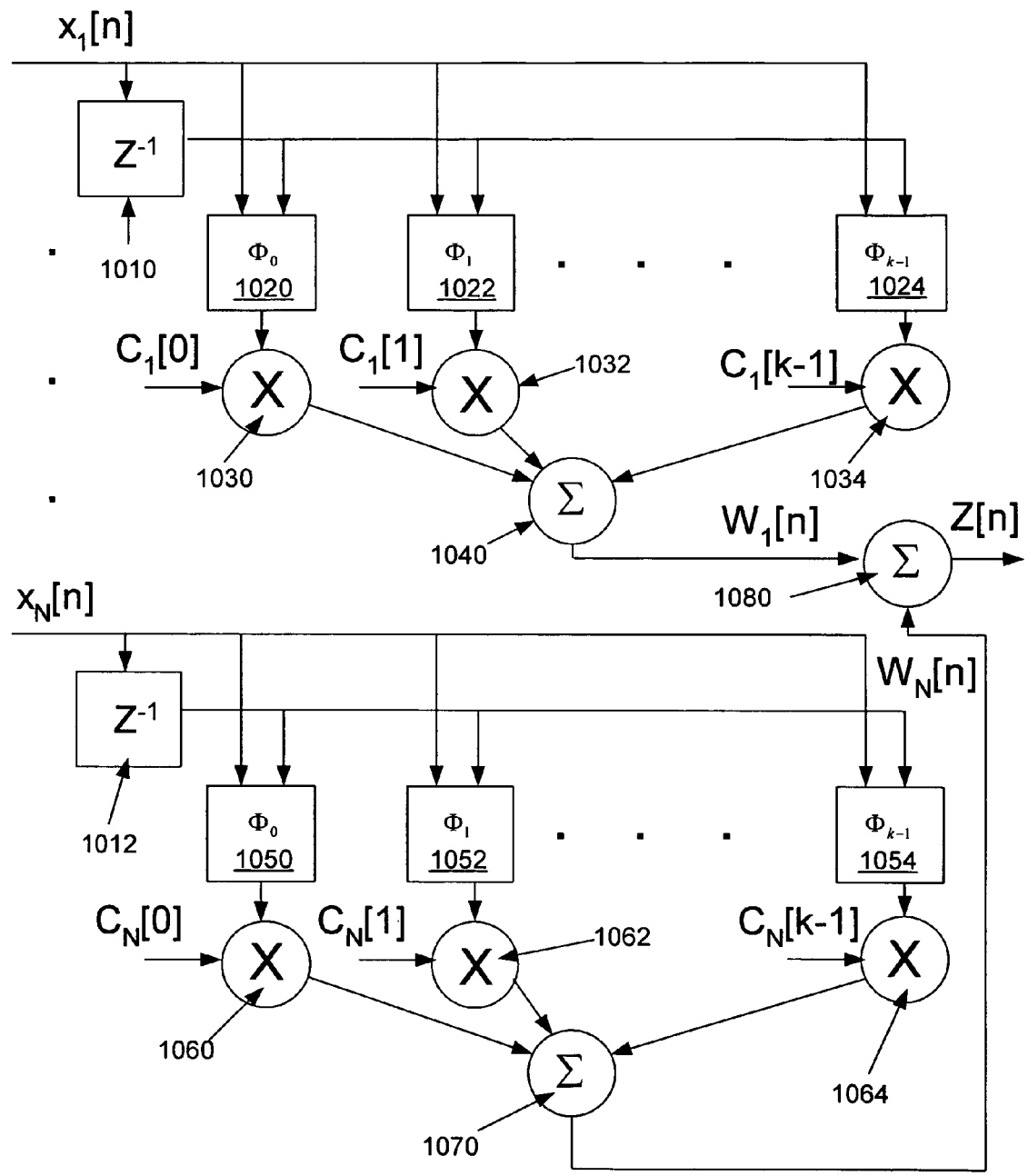
FIG. 10 shows a block diagram of one example of a multiple input non-linear filter.

FIG. 10 shows a block diagram of an exemplary multiple input non-linear filter. This non-linear filter configuration is particularly adaptable for use within an Ethernet transceiver that has non-linearity components due to a transmitter DAC, and non-linearity components due to a echo DAC, imposed on a receive signal. This implementation includes delays 1010, 1012. A first input section receives a first input x[n]. The first input x[n] and a delayed version of x[n] are connected to a set of multiple regressors 1020, 1022, 1024. Outputs of the sets of regressors are multiplied by coefficients $C_1[0], C_1[1] ... C_1[k-1]$ through multipliers 1030, 1032, 1034 and summed at a summer 1040 generating a first section output W1[n].

An Nth input section receives an Nth input xN[n]. The Nth input $x_N[n]$ and a delayed version of $x_N[n]$ are connected to a set of multiple regressors 1050, 1052, 1054. Outputs of the sets of regressors are multiplied by coefficients $C_N[0], C_N[1] ... C_N[k-1]$ through multipliers 1060, 1062, 1064 and summed at a summer 1070 generating an Nth section output $W_N[n]$.

FIG. 10 only shows two sections. However, clearly N can be any desired number. The non-linear filter includes N sections. The outputs of the N section of the non-linear filter are summed at a summer 1080, generating the non-linear replica signal Z[n].

One example of a method of adaptively determining values of the coefficients $C_1[0], C_1[1] ... C_1[k-1]$ for the first section includes correlating the digital receive signal from the receiver ADC with outputs of the regressors 1020, 1022, 1024. For example, the value of the coefficient $C_1[0]$ is determined by correlating the digital receive signal with the output of the regressor 1020, the value of the coefficient $C_1[1]$ is determined by correlating the digital receive signal with output of the regressor 1022 and the value of the coefficient $C_1[k-1]$ is determined by correlating the analog digital signal with the output of the regressor 1024.

One example of a method of adaptively determining values of the coefficients $C_N[0], C_N[1] ... C_N[k-1]$ for the Nth section includes correlating the digital receive signal from the receiver ADC with outputs of the regressors 1050, 1052, 1054. For example, the value of the coefficient $C_N[0]$ is determined by correlating the digital receive signal with the output of the regressor 1050, the value of the coefficient $C_1[1]$ is determined by correlating the digital receive signal with output of the regressor 1052 and the value of the coefficient $C_N[k-1]$ is determined by correlating the analog digital signal with the output of the regressor 1054.

The multiple inputs to the non-linear filter can be any combination of the transmit signal, the echo signal and the receive signal. The non-linear filter configuration shown in FIG. 10 is an example. Other configurations of non-linear filters could alternatively be used.

A Network of Devices

Figure 11:
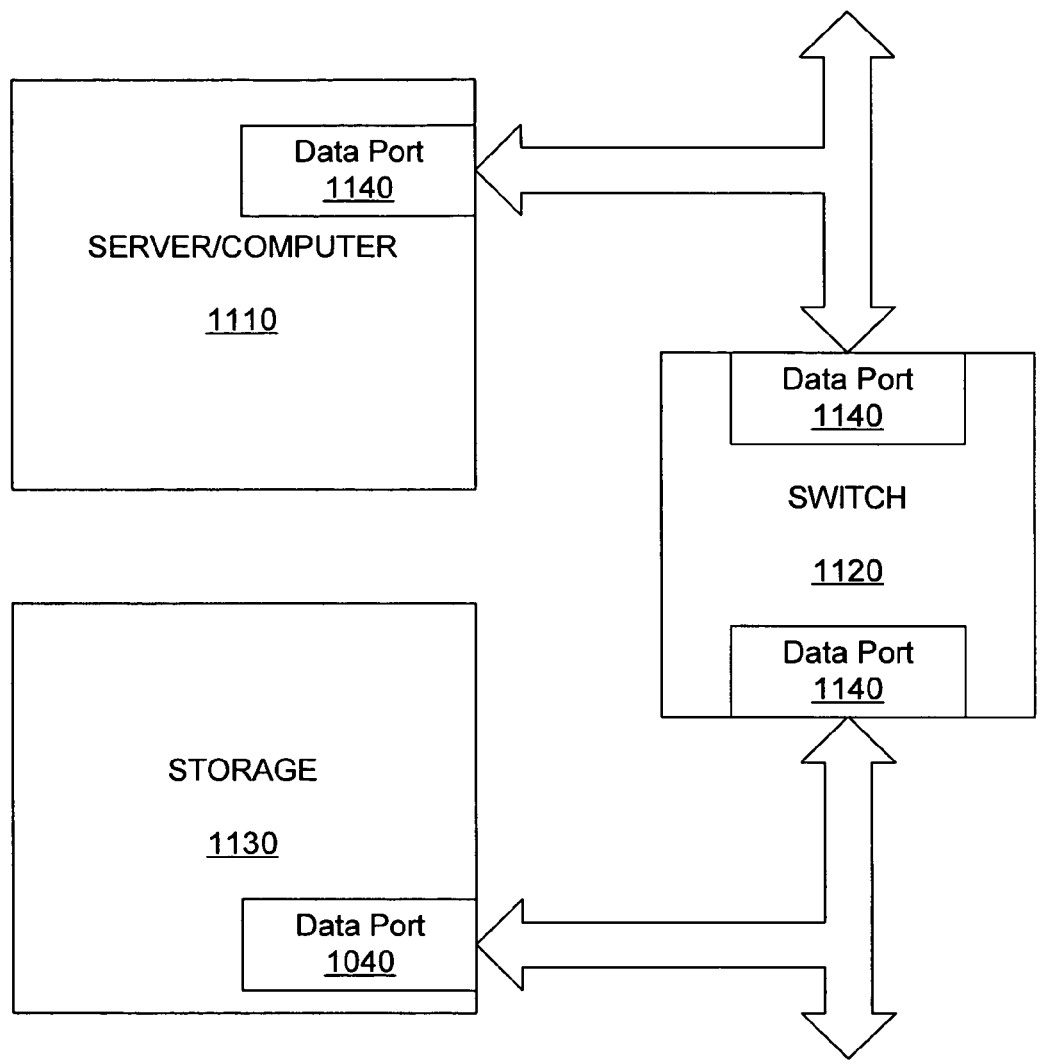
FIG. 11 shows devices connected to an Ethernet network that can include embodiments of the receive signal linearization.

FIG. 11 shows devices connected to an Ethernet network that can include embodiments of the transceiver linearizing. The network includes a server/computer 1110, a switch 1120 and storage 1130 that can all benefit from the use of a linearized transceiver 1140. The server/computer 1110 can be connected to the switch 1120 through an Ethernet twisted pair LAN connection. The switch 1120 can additionally be connected to the storage 1130 through an Ethernet twisted pair LAN connection. The linearized transceivers 1140 within the server/computer 1110, the switch 1120, and the storage 1130 can provide reduction of non-linear signal components of receive signals.

Although specific embodiments of the invention have been described and illustrated, the invention is not to be limited to the specific forms or arrangements of parts so described and illustrated. The invention is limited only by the appended claims.

What is claimed:

1. A method of reducing non-linear transmit signal components of a receive signal of a transceiver, the method comprising:
    the transceiver simultaneously transmitting a transmit signal, and receiving the receive signal;
    generating a non-linear replica signal of non-linear transmission signal components that are created in the transceiver by a transmit signal digital-to-analog converter (DAC), and imposed onto the receive signal, wherein generating the non-linear replica signal comprises non-linear filtering of the transmit signal, wherein the non-linear filtering comprises linear combinations of regressors, wherein each coefficient of a non-linear filter that performs the non-linear filtering is generated based on correlating an output of a receiver analog-to-digital-converter (ADC) with an output of a corresponding regressor within the non-linear filter;
    combining the non-linear replica signal with the received signal.

2. A method of reducing non-linear transmit signal components of a receive signal of a transceiver, the method comprising:
    the transceiver simultaneously transmitting a transmit signal, and receiving the receive signal;
    generating a non-linear replica signal of non-linear transmission signal components that are created in the transceiver by a transmit signal digital-to-analog converter (DAC), and imposed onto the receive signal, wherein generating the non-linear replica signal comprises non-linear filtering the transmit signal and an estimated echo signal, wherein the non-linear filtering comprises linear combinations of regressors, wherein each coefficient of a non-linear filter that performs the non-linear filtering is generated based on correlating an output of a receiver analog-to-digital-converter (ADC) with an output of a corresponding regressor within the non-linear filter;
    combining the non-linear replica signal with the received signal.

3. The method of claim 2, wherein determining the estimated echo signal, comprising:
    filtering the transmit signal.

4. A method of reducing non-linear transmit signal components of a receive signal of a transceiver, the method comprising:
  the transceiver simultaneously transmitting a transmit signal, and receiving the receive signal;
  generating a non-linear replica signal of non-linear transmission signal components that are created in the transceiver by a transmit signal digital-to-analog converter (DAC), and imposed onto the receive signal, wherein generating the non-linear replica signal comprises non-linear filtering the transmit signal and the receive signal, wherein the non-linear filtering comprises linear combinations of regressors, wherein each coefficient of a non-linear filter that performs the non-linear filtering is generated based on correlating an output of a receiver analog-to-digital-converter (ADC) with an output of a corresponding regressor within the non-linear filter;
  combining the non-linear replica signal with the received signal.
  combining the non-linear replica signal with the transmit signal before the transmit signal is summed with the receive signal.

5. A method of reducing non-linear transmit signal components of a receive signal of a transceiver, the method comprising:
  the transceiver simultaneously transmitting a transmit signal, and receiving the receive signal;
  generating a non-linear replica signal of non-linear transmission signal components that are created in the transceiver by a transmit signal digital-to-analog converter (DAC), and imposed onto the receive signal, wherein generating the non-linear replica signal comprises non-linear filtering a combination of the transmit signal, an estimated echo signal, and the receive signal, wherein the non-linear filtering comprises linear combinations of regressors, wherein each coefficient of a non-linear filter that performs the non-linear filtering is generated based on correlating an output of a receiver analog-to-digital-converter (ADC) with an output of a corresponding regressor within the non-linear filter;
  combining the non-linear replica signal with the received signal.

6. The method of claim 5, further comprising digital to analog converting the estimated echo signal with an estimated echo signal DAC, and wherein sampling of at least one of the transmit DAC and the estimated echo signal DAC are over-sampled.

7. An Ethernet transceiver comprising:
  a transmitter transmitting a transmit signal;
  a receiver far receiving a receive signal;
  a non-linear filter receiving the transmit signal and generating a non-linear replica signal of non-linear transmit signal digital-to-analog converter (DAC) components imposed onto receive signal in the transceiver, wherein generating the non-linear replica signal comprises non-linear filtering of the transmit signal, wherein the non-linear filtering comprises linear combinations of regressors, wherein each coefficient of a non-linear filter that performs the non-linear filtering is generated based on correlating an output of a receiver analog-to-digital-converter (ADC) with an output of a corresponding regressor within the non-linear filter;
  a summer combining the non-linear replica signal with the receive signal.

8. The transceiver of claim 7, wherein the non-linear filter additionally receives a replica echo signal, and the non-linear replica signal includes non-linear transmission signal DAC components imposed onto the receive signal and non-linear replica echo signal DAC components coupled onto the receive signal.

9. The transceiver of claim 8, wherein at least one of the transmit DAC and an echo DAC are over-sampled.

10. The transceiver of claim 8, wherein the replica echo signal is generated by filtering the transmit signal.

11. The transceiver of claim 7, wherein the non-linear filter additionally receives the receive signal.

12. The transceiver of claim 8, wherein the non-linear filter additionally receives the receive signal.

13. The transceiver of claim 7, wherein the non-linear filter comprises linear combinations of known non-linear functions.

14. A method of linearizing a Ethernet received signal of an Ethernet transceiver, comprising:
  the transceiver simultaneously transmitting a transmit signal, and receiving the receive signal;
  generating a non-linear replica signal, the non-linear replica signal approximating non-linear signal components of the transmit signal imposed onto the receive signal within the transceiver, wherein generating the non-linear replica signal comprises non-linear filtering of the transmit signal, wherein the non-linear filtering filter that performs the non-linear filtering is generated based on correlating an output of a receiver analog-to-digital-converter (ADC) with an output of a corresponding regressor within the non-linear filter;
  combining the non-linear replica signal within the transmit signal before the transmit signal is summed with the receive signal.

15. The method of claim 14, wherein the non-linear filtering comprises linear combinations of known non-linear functions.

16. The method of claim 14, wherein generating the non-linear replica signal further comprises:
  non-linear filtering the transmit signal and non-linear filtering an estimated echo signal.

17. The method of claim 16, wherein the non-linear components of the transmission signal are generated by a transmit DAC and non-linear elements of the estimated echo signal are generated by an echo DAC, and sampling of at least one of the transmit DAC and the estimated echo signal DAC is over-sampled.

* * * * *